United States Patent
Chang (10) Patent No.: US 10,913,378 B2
(45) Date of Patent: Feb. 9, 2021

(54) SEAT RECLINER FOR VEHICLE (71) Applicant: HYUNDAI TRANSYS INCORPORATED, Seosan-si (KR)

(72) Inventor: Seung Hun Chang, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 34 days.

(21) Appl. No.: 16/381,211

(22) Filed: Apr. 11, 2019

(65) Prior Publication Data
US 2019/0337424 A1 Nov. 7, 2019

(30) Foreign Application Priority Data

May 2, 2018 (KR) .......................... 10-2018-0050423

(51) Int. Cl.
*B60N 2/00* (2006.01)
*B60N 2/235* (2006.01)
*B60N 2/20* (2006.01)

(52) U.S. Cl.
CPC .............. *B60N 2/2356* (2013.01); *B60N 2/20* (2013.01)

(58) Field of Classification Search
CPC ........ B20N 2/20; B20N 2/2227; B20N 2/235; B20N 2/2356; B20N 2/2362; B20N 2/22; B60N 2/20; B60N 2/2227; B60N 2/235; B60N 2/2356; B60N 2/2362; B60N 2/22
USPC .............................. 297/354.12, 367 L, 367 P
See application file for complete search history.

(56) References Cited

U.S. PATENT DOCUMENTS

| 5,984,413 | A  | * | 11/1999 | Baloche | ............... | B60N 2/2358 |
|---|---|---|---|---|---|---|
|  |  |  |  |  |  | 297/367 R |
| 7,648,204 | B2 | * | 1/2010 | Oki | ........................ | B60N 2/236 |
|  |  |  |  |  |  | 297/367 L |
| 7,703,852 | B2 | * | 4/2010 | Wahls | .................... | B60N 2/236 |
|  |  |  |  |  |  | 297/367 R |
| 8,038,218 | B2 |  | 10/2011 | Wahls |  |  |

(Continued)

FOREIGN PATENT DOCUMENTS

| JP | 2009-072416 A | 4/2009 |
|---|---|---|
| JP | 2013-070856 A | 4/2013 |

(Continued)

OTHER PUBLICATIONS

Korean Notice of Allowance dated Apr. 24, 2020 from the corresponding Korean Application No. 10-2018-0050422, 2 pp.

(Continued)

*Primary Examiner* — Chi Q Nguyen
(74) *Attorney, Agent, or Firm* — Brinks Gilson & Lione (57) ABSTRACT

A seat recliner for a vehicle includes a step inserted in an assembly hole of a seat frame and a second flange, and a conventional sub-guide protrusion of a lock gear is removed. The second flange is provided with both a free section and a locking section using only a guide protrusion. The seat recliner includes: a first flange having a plurality of guide parts, and a guide space; a plurality of lock gears disposed in the guide spaces of the first flange; a lock cam disposed on the first flange; a control part disposed on the lock gears and the lock cam; and a second flange including a first part and the second part, and coupled to the seat frame by insertion of an outer circumferential surface of the second part into an assembly hole of the seat frame.

8 Claims, 9 Drawing Sheets

(56) References Cited

U.S. PATENT DOCUMENTS

| | | | |
|---|---|---|---|
| 8,042,872 B2* | 10/2011 | Kim | B60N 2/2356 297/367 L |
| 8,430,454 B2 | 4/2013 | Tanguy et al. | |
| 8,523,281 B2 | 9/2013 | Wahls | |
| 8,720,999 B2 | 5/2014 | Peters | |
| 8,864,234 B2 | 10/2014 | McCulloch et al. | |
| 8,955,910 B2 | 2/2015 | Line et al. | |
| 9,296,315 B2* | 3/2016 | Hellrung | B60N 2/236 |
| 10,093,201 B2 | 10/2018 | Auer et al. | |
| 2012/0169105 A1 | 7/2012 | Assmann et al. | |
| 2012/0205956 A1* | 8/2012 | Nock | B60N 2/20 297/362 |
| 2013/0001997 A1 | 1/2013 | Gallienne et al. | |
| 2013/0320735 A1* | 12/2013 | McCulloch | B60N 2/2358 297/362 |
| 2014/0110984 A1* | 4/2014 | Assmann | B60N 2/22 297/354.1 |
| 2014/0132053 A1 | 5/2014 | Schuler et al. | |
| 2014/0239691 A1* | 8/2014 | Hellrung | B60N 2/236 297/354.1 |
| 2014/0239693 A1* | 8/2014 | Nock | B60N 2/2252 297/361.1 |
| 2015/0008715 A1* | 1/2015 | Hur | B60N 2/2356 297/367 R |
| 2015/0069809 A1* | 3/2015 | Matt | B60N 2/2356 297/366 |
| 2015/0084392 A1 | 3/2015 | Chang | |
| 2015/0321585 A1* | 11/2015 | McCulloch | B60N 2/236 297/367 P |
| 2016/0023578 A1 | 1/2016 | Tame et al. | |
| 2017/0341539 A1 | 11/2017 | Chang | |
| 2017/0361736 A1 | 12/2017 | Chang | |

FOREIGN PATENT DOCUMENTS

| | | |
|---|---|---|
| KR | 10-2009-0099568 A | 9/2009 |
| KR | 10-2013-005443 A | 5/2013 |
| KR | 10-2014-0001651 | 1/2014 |
| KR | 10-1453077 B1 | 10/2014 |
| KR | 10-1690041 B1 | 12/2016 |
| KR | 10-1725412 | 4/2017 |
| KR | 10-1746455 B1 | 6/2017 |
| KR | 10-1787990 B1 | 10/2017 |
| WO | 2012/038020 A1 | 3/2012 |

OTHER PUBLICATIONS

Korean Office Action dated Jun. 11, 2019 from the corresponding Korean Application No. 10-2018-0050424, 6 pp.
Korean Office Action dated May 28, 2019 from the corresponding Korean Application No. 10-2018-0050422, 7 pp.
Korean Office Action dated May 30, 2019 from the corresponding Korean Application No. 10-2018-0050423, 6 pp.

* cited by examiner

SEAT RECLINER FOR VEHICLE

CROSS REFERENCE TO RELATED APPLICATION

The present application claims priority to and the benefit of Korean Patent Application No. 10-2018-0050423, filed May 2, 2018, the entire contents of which are incorporated herein by reference.

FIELD

The present disclosure relates generally to a seat recliner for a vehicle.

BACKGROUND

The statements in this section merely provide background information related to the present disclosure and may not constitute prior art.

Generally, in a vehicle seat, a recliner is provided between a seat cushion and a seat back, and when necessary, the recliner is released from a locked state for reclining, and is locked for maintaining a desired angle after reclining.

This seat recliner is generally configured such that a first flange is fixed, and a second flange is relatively rotated, with a lock gear provided in the recliner. When the lock gear is engaged with the second flange, the recliner is locked, and when the lock gear is released, the second flange is relatively rotated on the first flange so that the seat back is available to be reclined on the basis of the seat cushion.

Figure 1:
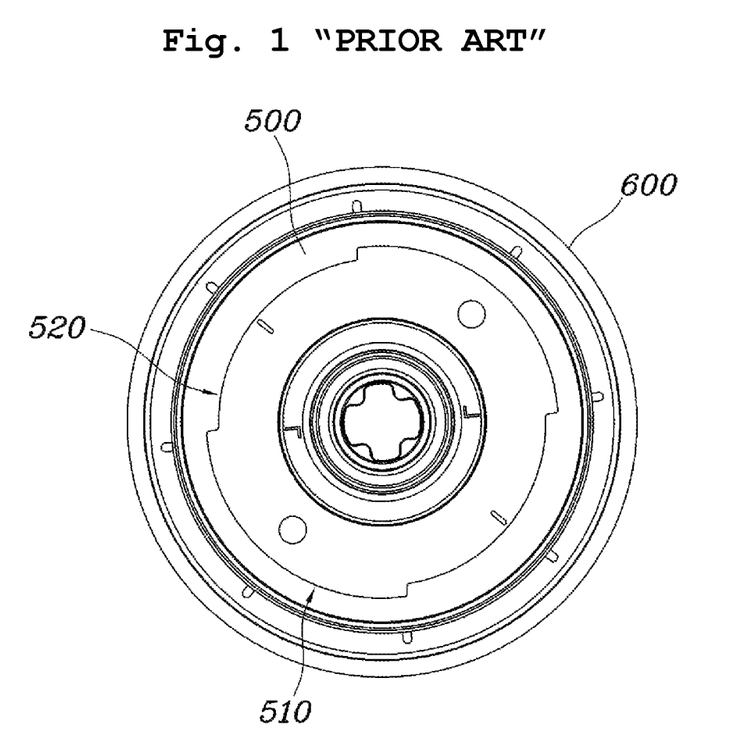
FIGS. 1 and 2 are a top view of an assembled recliner and a cross-sectional view of a second flange according to the related art, respectively.
Figure 2:
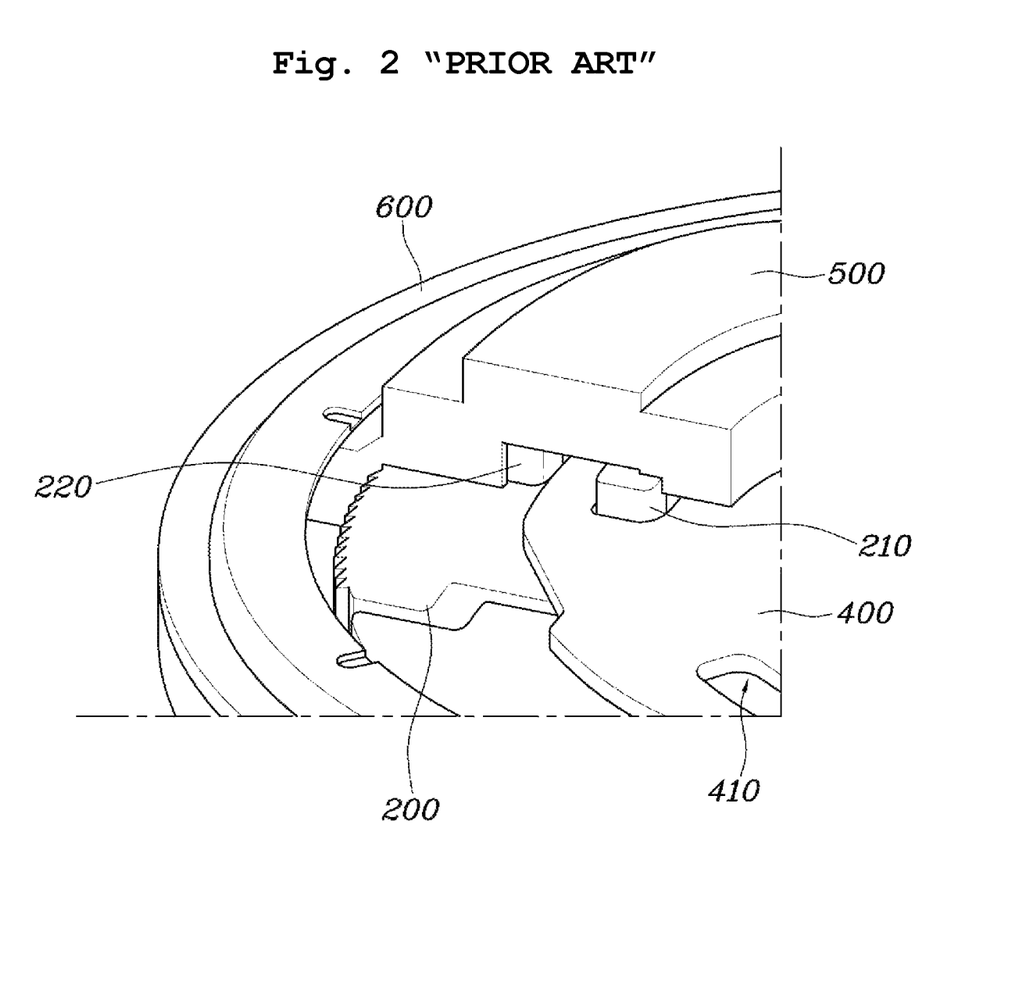
Figure 3:
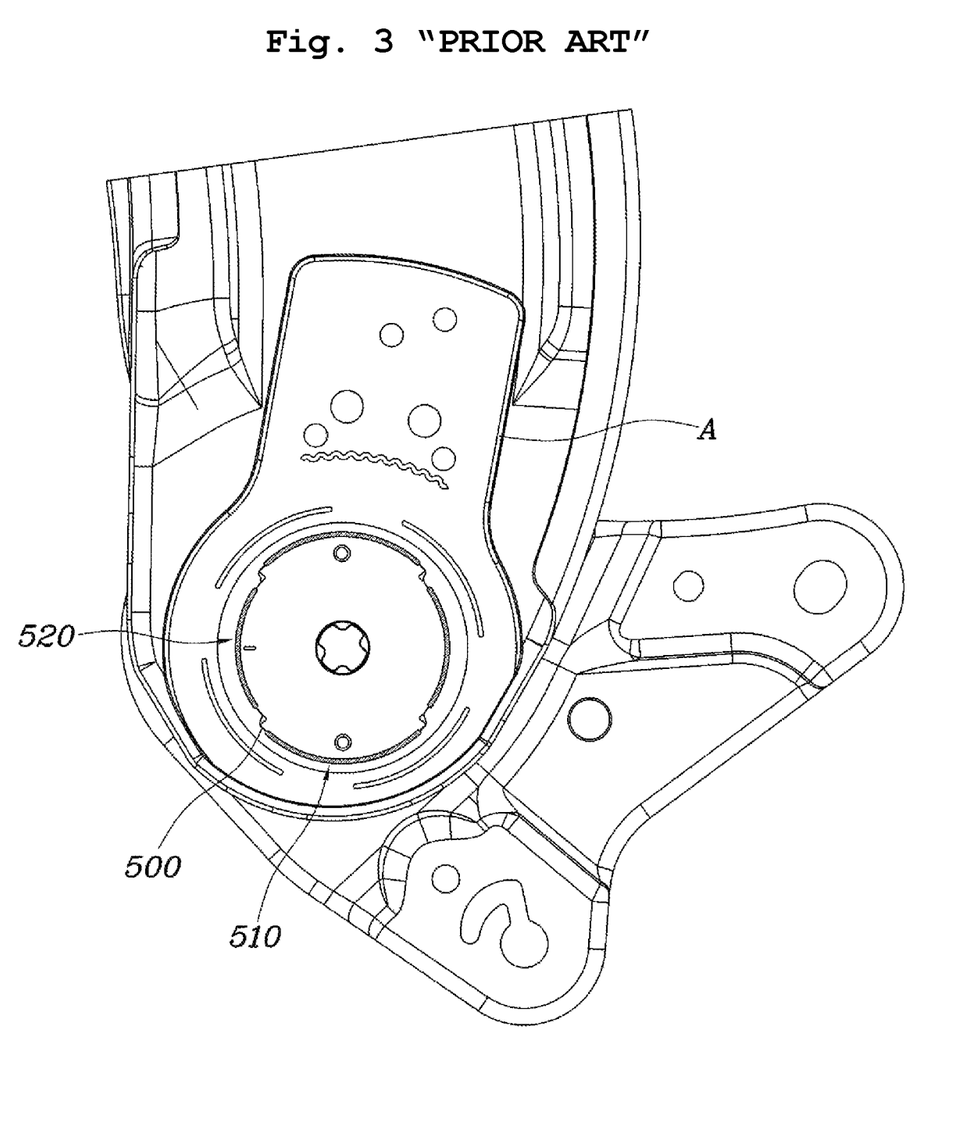
FIG. 3 is a view showing a state in which a seat frame and the second flange according to the related art are coupled to each other.

FIGS. 1 and 2 are a top view of an assembled recliner and a cross-sectional view of a second flange according to the related art, respectively, FIG. 3 is a view showing a state in which a seat frame and the second flange are coupled to each other according to the related art.

Referring to FIGS. 1 to 3, the conventional recliner has a weld line along which the second flange 500 is welded in a state of being inserted into an assembly hole (not shown) of the seat frame A. However, we have discovered that since the weld line is divided into inside and outside lines, assembly performance degradation is caused when the recliner is welded.

In addition, in the conventional recliner, a sub-guide protrusion 220 is provided on a lock gear 200 for maintaining a state in which the lock gear 200 slides inward in a free section of the second flange 500. However, we have found that since the sub-guide protrusion 220 is supported by the inside of the second flange 500, the free section in which the first flange (not shown) and the second flange 500 are freely rotated relative to each other is different in a position and a length thereof for each product. Therefore, when the shape of the weld line is changed, the seat frame A should be changed.

In addition, in order to provide a space in which the sub-guide protrusion 220 of the lock gear 200 is rotated, outer thickness of a guide slit 410 of a control part 400 should be reduced, therefore, it is difficult to provide sufficient rigidity of the control part 400.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a seat recliner for a vehicle, in which a step inserted in an assembly hole of a seat frame is added to a second flange, a conventional sub-guide protrusion of a lock gear is removed from a configuration, and the second flange is provided with both a free section and a locking section using only a guide protrusion.

In one form of the present disclosure, a seat recliner for a vehicle may include: a first flange having a plurality of guide parts, wherein the guide parts are spaced apart from each other with a distance and arranged along a circumferential direction of the first flange such that a plurality of guide spaces are defined by the guide parts (e.g., a space between the guide parts); a plurality of lock gears configured to slide inward and outward along the plurality of guide parts, respectively such that lower surfaces of the plurality of lock gears are seated on corresponding guide spaces of the plurality of guide spaces when assembled, wherein the lock gears respectively includes: a guide protrusion provided on an upper surface of the lock gears, and a plurality of outer teeth provided on an outer end surface thereof; a lock cam disposed at the center of the first flange, and compressing an inner end of the plurality of lock gears as the lock cam is rotated so that the lock gears slide outward; a control part disposed on upper surfaces of the plurality of lock gears and the lock cam, and having at least one guide slit in which the guide protrusion of the lock gears is inserted and guided by the at least one guide slit; and a second flange having a first part covering an upper part of the lock gears or the guide parts, and a second part provided on an upper part of an inner circumferential surface of the first part and configured to cover an outside of the at least one guide slit of the control part from a top, where the second part is coupled to a seat frame by inserting an outer circumferential surface of the second part into an assembly hole of the seat frame.

The outer circumferential surface of the second part may be shaped into a single circular line without a step provided inward or outward.

The second flange may be configured such that the outer circumferential surface thereof is inserted into the assembly hole of the seat frame and is welded along entire circumference of the second flange, thereby being coupled to the seat frame.

The second flange further may include a base part which is provided on a lower part of an outer circumferential surface of the first part and has inner teeth engaged with the lock gear, and the seat recliner for the vehicle may further include: a retainer disposed on an upper part of the base part of the second flange and fixing coupling of the first flange and the second flange.

The second part may be provided with a locking section in which the guide protrusion, which is guided by the guide slit so that the lock gear is slidable inward and outward, does not interfere with an inner circumferential surface of the second part.

The second part may be provided with a free section supporting the guide protrusion so that the lock gear does not slide outward through the inner circumferential surface of the second part.

The second flange further may include a third part which is provided on an upper part of the inner circumferential surface of the second part and covers an upper part of the guide protrusion, an inner circumferential surface of the third part may form a first through hole, and a center part of the control part may protrude upward and may be inserted into the first through hole.

The center part of the control part may form a second through hole, and at least one fastening part may be formed along an inner circumferential surface of the center part forming the second through hole. In particular, the seat recliner may further include: a shaft penetrating through the second through hole and rotated along with the control part, wherein the shaft may be locked to the at least one fastening part in a state of being inserted into the second through hole.

The fastening part may be a tapered shape along an inward direction of the second through hole, so that a lower end of the fastening part is fixed to the inner circumferential surface of the center part and is wider than an upper end of the fastening part.

An inner diameter of the shaft may be larger than an inner diameter defined by upper ends of a plurality of fastening parts, so that the shaft may be forcibly fitted in the fastening parts and is inhibited or prevented from being removed in a reverse direction in a state of penetrating through the third through hole.

In the seat recliner according to the present disclosure, the weld line of an assembly step of the second flange, which is inserted into the assembly hole of the seat frame and coupled to the seat frame, is integrally foamed, so assembly performance of the seat recliner can be improved.

In addition, even if the free section is varied for each product, the weld line of seat recliner of the present disclosure is not necessary to be changed, so the seat frame can be compatibly used.

In addition, since the conventional sub-guide protrusion of the lock gear is removed in the configuration of the seat recliner according to the present disclosure, the seat recliner of the present disclosure provides the desired outer thickness of the guide slit of the second flange, so sufficient rigidity of the seat recliner can be realized.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure may be embodied in many different forms without departing from the spirit and significant characteristics of the present disclosure. Therefore, the forms of the present disclosure are disclosed only for illustrative purposes and should not be construed as limiting the present disclosure.

Reference will now be made in detail to various forms of the present disclosure, specific examples of which are illustrated in the accompanying drawings and described below, since the forms of the present disclosure can be variously modified in many different forms. While the present disclosure will be described in conjunction with exemplary forms thereof, it is to be understood that the present description is not intended to limit the present disclosure to those exemplary forms. On the contrary, the present disclosure is intended to cover not only the exemplary foams, but also various alternatives, modifications, equivalents and other forms that may be included within the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

The terminology used herein is for the purpose of describing particular forms only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary foams of the present disclosure will be described in detail with reference to the accompanying drawings. Throughout the drawings, the same reference numerals will refer to the same or like parts.

Figure 4:
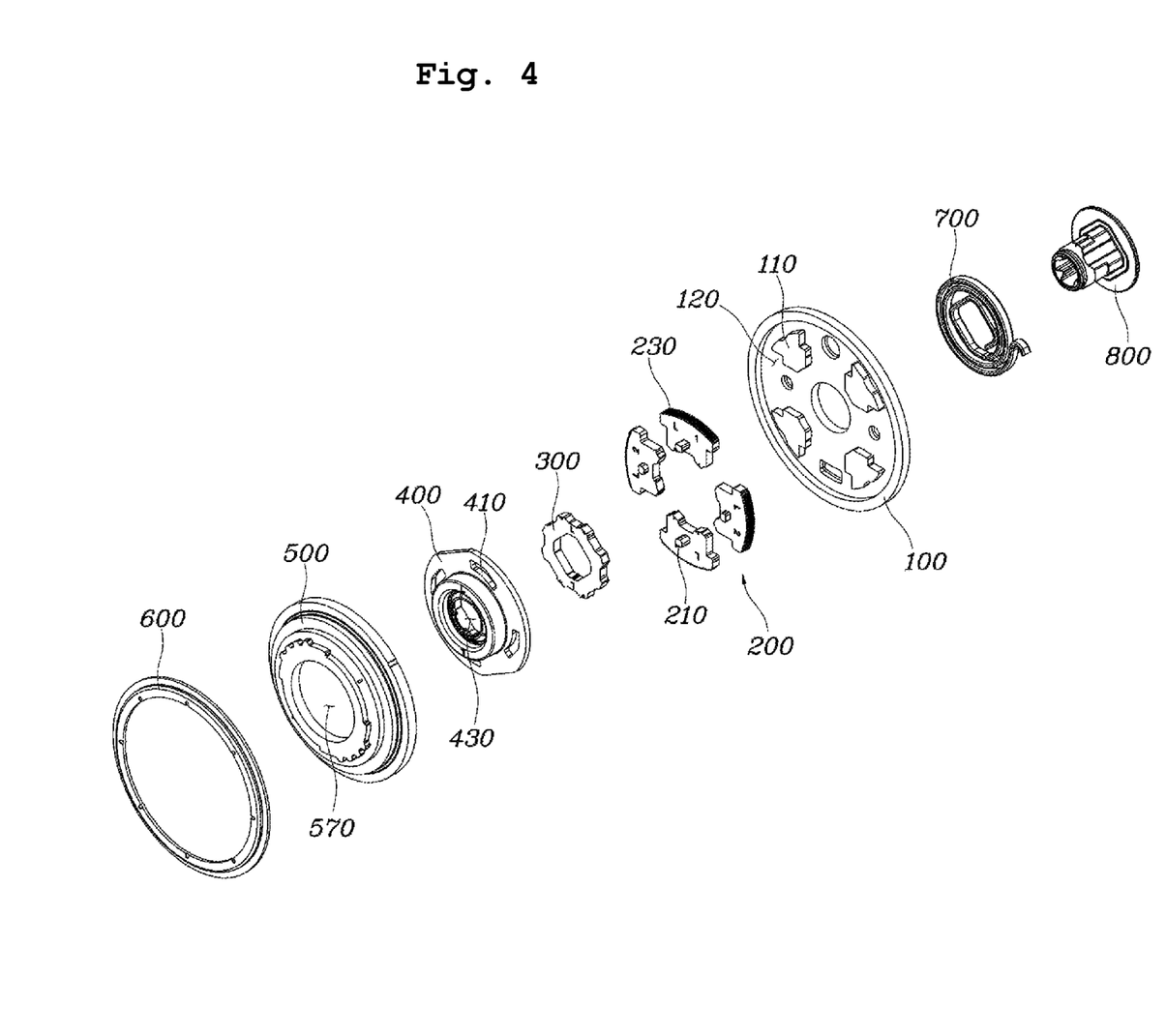
FIG. 4 is an exploded perspective view of a seat recliner for a vehicle according to one form of the present disclosure.
Figure 5:
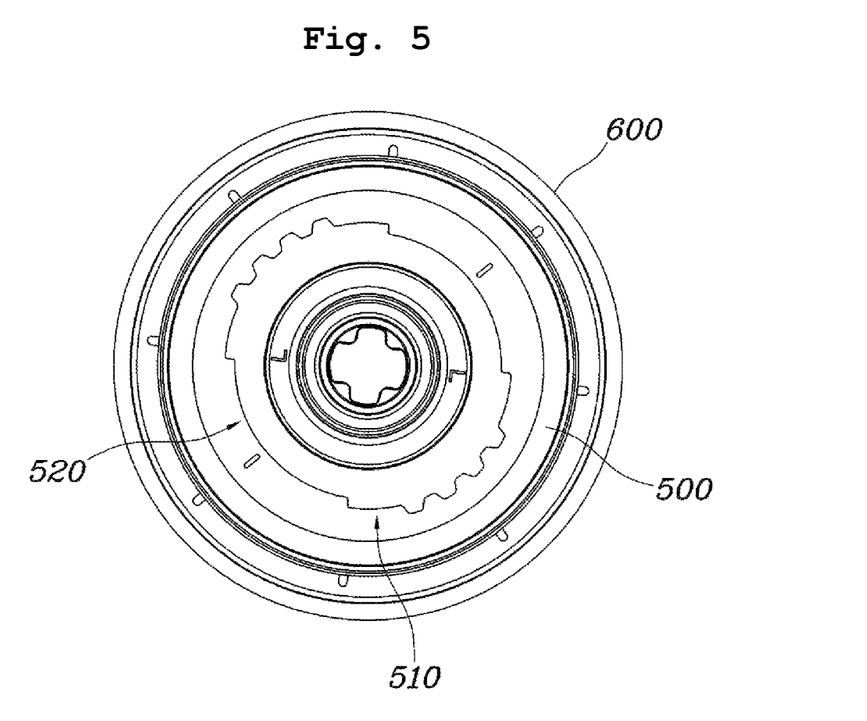
FIGS. 5 and 6 are a top view of an assembled recliner and a cross-sectional view of a second flange according to one form of the present disclosure, respectively.
Figure 6:
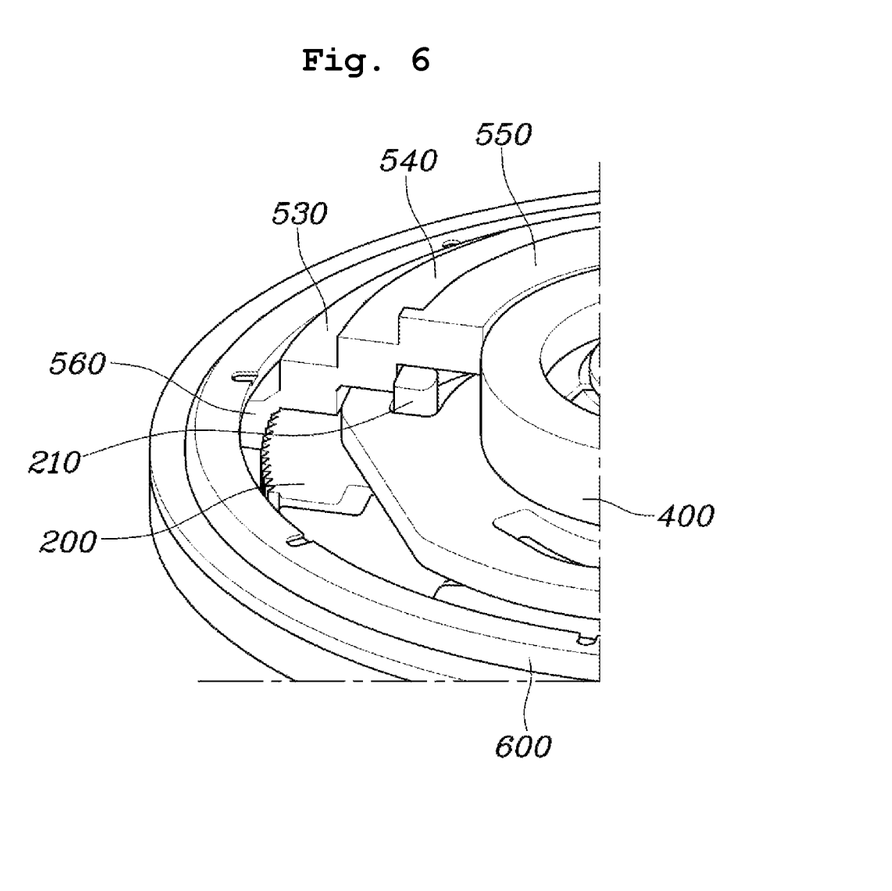
Figure 7:
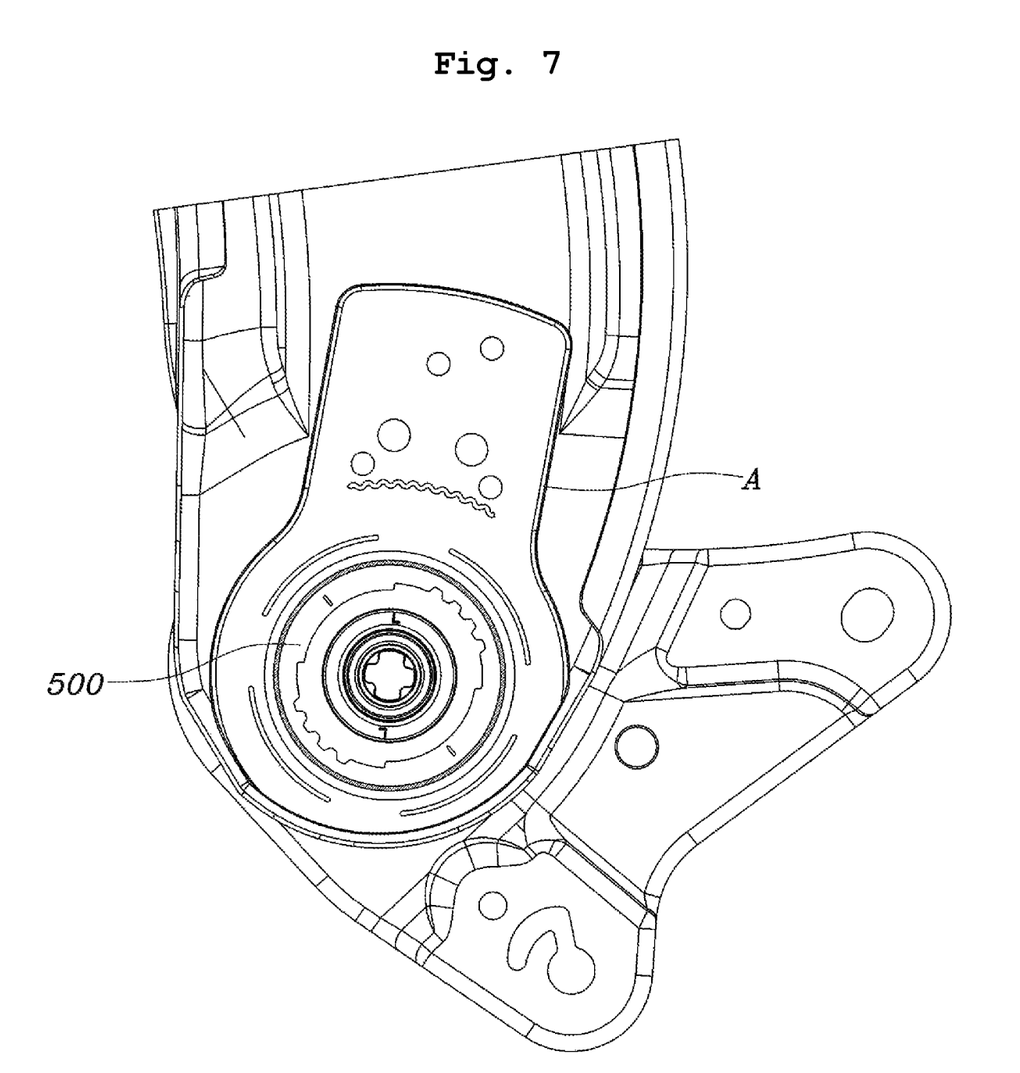
FIG. 7 is a view showing a state in which the seat frame and the second flange are coupled to each other according to one form of the present disclosure.

FIG. 4 is an exploded perspective view of a seat recliner for a vehicle according to one form of the present disclosure. FIGS. 5 and 6 are a top view of an assembled recliner and a cross-sectional view of a second flange 500 according to one form of the present disclosure, respectively. FIG. 7 is a view showing a state in which the seat frame A and the second flange 500 are coupled to each other.

Referring to FIGS. 4 to 7, the seat recliner for the vehicle according to one form of the present disclosure includes: a first flange 100 having a plurality of guide parts 110 disposed at a distance of each other in a circumferential direction, and a guide space 120 between each of the guide parts 110; a plurality of lock gears 200 each disposed at each guide space of the first flange 100, and configured such that a lower surface thereof is seated on the guide space 120, a guide protrusion 210 is formed on an upper surface thereof, the lock gears 200 slide inward and outward along the guide part 110, and a plurality of outer teeth 230 is formed on an outer end thereof; a lock cam 300 disposed at the center of the first flange 100, and compressing an inner end of the plurality of lock gears 200 as the lock cam 300 is rotated so that the lock gears 200 slides outward; a control part 400 disposed on the upper surface of the plurality of lock gears 200 and the lock cam 300, and having a guide slit 410 in which the guide protrusion 210 of each of the lock gears 200 is inserted and guided by the guide slit 410; and a second flange 500 having a first part 530 covering an upper part of the lock gear 200 or the guide part 110 and a second part 540 provided on an upper part of an inner circumferential surface of the first part 530 and covering an outside of the guide slit 410 of the control part 400 from the top, and coupled to a seat frame A by insertion of an outer circumferential surface of the second part 540 into an assembly hole of the seat frame A.

Particularly, the first flange 100 has the plurality of the guide parts 110 which are shaped into a protruding shape and spaced from each other in the circumferential direction of the first flange 100, and the guide space 120 is provided between each of the guide parts 110. The lock gear 200 is disposed on each guide space 120.

The lock gear 200 is disposed at each guide space 120 of the first flange 100, is configured such that the lower surface thereof is seated on the guide space 120, and slides inward and outward along the guide part 110. The outer teeth 230 are formed on the outer end of the lock gear 200, and the lock gear 200 slides inward and outward, so the outer teeth 230 of the lock gear 200 may be engaged with or be separated from inner teeth formed on an inner end of the second flange 500 as will be described later herein. When the outer teeth 230 of the lock gear 200 are engaged with the inner teeth of the second flange 500, relative rotation of the first flange 100 and the second flange 500 is locked so that a seat back and a seat cushion can be maintained at a desired angle.

The guide protrusion 210 is formed on the upper surface of the lock gear 200, and inserted in the guide slit 410 of the control part 400, so that the lock gear 200 is engaged with the control part 400 through the guide protrusion 210. Therefore, when the control part 400 is rotated, the guide protrusion 210 of the lock gear 200 moves along the guide slit 410, and as the lock gear 200 slides inward, teeth engagement between the lock gear 200 and the second flange 500 is released. In this case, when a fixed state between the first flange 100 and the second flange 500 is released, the angle between the seat back and the seat cushion can be relatively adjusted.

The lock cam 300 is disposed at the center of the first flange 100, and the lock gears 200 are disposed around an outer side of the lock cam 300. The lock cam 300 compresses the plurality of lock gears 200 so that the lock gears 200 slide outward, and when the lock cam 300 is rotated, the lock gears 200 slide inward. The control part 400 is disposed on the upper surfaces of the plurality of the lock gears 200 and the lock cam 300, and covers all the upper surfaces of the lock cam 300 and the lock gears 200. The guide protrusion 210 of the lock gear 200 is inserted in the control part 400, and the guide slit 410 is provided to guide the guide protrusion 210 along a route when the control part 400 is rotated.

The second flange 500 covers an upper surface of the control part 400. Particularly, the second flange 500 includes the first part 530 covering the upper part of the lock gear 200 or the guide part 110 and the second part 540 famed on the upper part of the inner circumferential surface of the first part 530 and covering the outside of the guide slit 410 of the control part 400 from the top. The outer circumferential surface of the second part 540 is inserted into the assembly hole of the seat frame A, thereby coupling the second part 540 and the seat frame A together.

According to this configuration, since the outer circumferential surface of the second part 540 of the second flange 500 is coupled to the seat frame A in the state of insertion into the assembly hole of the seat frame A, the seat recliner of the present disclosure can have improved assembly performance between the second flange 500 and the seat frame A.

The outer circumferential surface of the second part 540 may be shaped into a single circular line without a step inward or outward. That is, since the outer circumferential surface of the second part 540 inserted into the assembly hole of the seat frame A is shaped into the single circular line, the corresponding assembly hole of the seat frame A also may have a single circular shape. Accordingly, even if each product has a different free section 520 as described later herein, the seat frame A may be compatibly used therein.

Especially, the second flange 500 may be welded along entire circumference in a state in which the outer circumferential surface of the second part 540 is inserted into the assembly hole of the seat frame A and be coupled to the seat frame A. Accordingly, as a weld line between the seat frame A and the second flange 500 is integrally provided without being disconnected and separated inward and outward, a welding process can be simplified.

The second flange 500 may further includes a base part 560 which is provided at a lower part of an outer circumferential surface of the first part 530 and has the inner teeth engaged with the lock gear 200. The seat recliner of the present disclosure further includes: a retainer 600 disposed on an upper part of the base part 560 of the second flange 500, and fixing the coupling of the first flange 100 and the second flange 500.

That is, in the second flange 500, the base part 560 may be provided on the lower part of the outer circumferential surface of the first part 530 covering the upper surface of the lock gear 200 or the guide part 110, and the inner teeth engaged with the lock gear 200 may be provided on an inner circumferential surface of the base part 560. In addition, the retainer 600 may be coupled to the upper part of the base part 560.

The second flange 500 may further include a third part 550 provided on an upper part of an inner circumferential surface of the second part 540 and covering an upper part of the guide protrusion 210, and a first through hole 570 is formed along an inner circumferential surface of the third part 550. A center part of the control part 400 protrudes upward, and the protruding center part of the control part 400 may be inserted into the first through hole 570. That is, the center part protruding upward of the control part 400 may be inserted into the first through hole 570 defined of the inner circumferential surface of the third part 550.

Consequently, the second flange 500 is configured to have the base part 560 having the inner teeth on the inner circumferential surface thereof to be engaged with the lock gear 200; the first part 530 provided on an upper part of the inner circumferential surface of the base part 560 and covering the upper part of the lock gear 200 or the guide part 110; the second part 540 provided on the upper part of the inner circumferential surface of the first part 530 and covering the outside of the guide slit 410 of the control part 400; and the third part 550 provided on the upper part of the inner circumferential surface of the second part 540 and covering the upper part of the guide protrusion 210, in which the first through hole 570 may be provided at a center part of the third part 550. Especially, a step provided between the inner circumferential surface of the first part 530 and the outer circumferential surface of the second part 540 is inserted into the assembly hole of the seat frame A and is welded.

The second part 540 may be provided with a locking section 510 in which the guide protrusion 210, which is guided by the guide slit 410 so that the lock gear 200 is slidable inward and outward, does not interfere with the inner circumferential surface of the second part 540, and with a free section 520 supporting the guide protrusion 210 with the inner circumferential surface so that the lock gear 200 does not slide outward.

That is, the inner circumferential surface of the second part 540 is configured of the locking section 510 spaced outwardly from the free section 520 so that the guide protrusion 210 of the lock gear 200 does not interfere therewith. In addition, the inner circumferential surface of the second part 540 is also configured of the free section 520 spaced inwardly from the locking section 510 for supporting the guide protrusion 210 so that the lock gear 200 does not slide outward. Therefore, the inner circumferential surface of the second part 540 may be respectively spaced apart inward and outward thereby being stepped.

Specifically, in the locking section 510 of the second part 540, since the guide protrusion 210 does not interfere with the inner circumferential surface of the second part 540, the guide slit 410 guides the guide protrusion 210 when the control part 400 is rotated, and the lock gear 200 slides outward, so the outer teeth 230 of the lock gear 200 and the inner teeth of the second flange 500 may be engaged with each other.

However, in the free section 520 of the second part 540, the guide protrusion 210 is supported by the inner circumferential surface of the second part 540 so that the lock gear 200 does not slide outward. Accordingly, the lock gear 200 is locked in a state of sliding inward and does not slide outward, thus the outer teeth 230 of the lock gear 200 and the inner teeth of the second flange 500 are not engaged with each other, and the first flange 100 and the second flange 500 are locked in a state of being freely rotatable relative to each other.

Accordingly, in the second frame according to the related art, the sub-guide protrusion 220 is provided on the lock gear 200 to support the lock gear 200 so that the lock gear 200 does not slide outward on the free section 520. However, in the present disclosure, by removing the sub-guide protrusion 220 from the configuration and only placing the guide protrusion 210 in the free section 520, it is possible to solve the problems that the desired outer thickness of the guide slit 410 of the control part 400 cannot be provided due to sub-guide protrusion 220. In addition, desired rigidity of the control part 400 can be realized by securing the desired outer thickness of the guide slit 410, and productivity is improved by removing the sub-guide protrusion 220 of the lock gear 200 and simplifying the shape thereof.

Figure 8A:
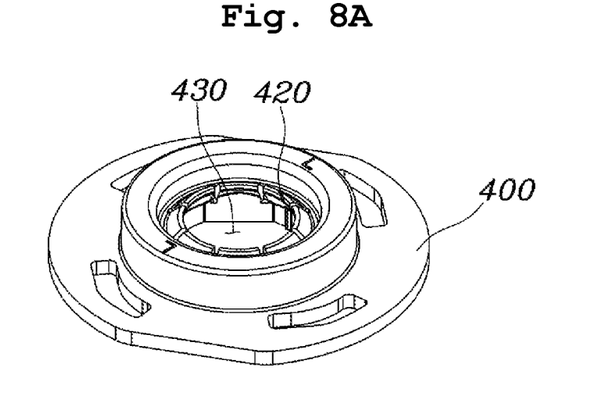
FIGS. 8A and 8B are exploded perspective views respectively showing a first flange and a control part which are assembled according to one form of the present disclosure.
Figure 8B:
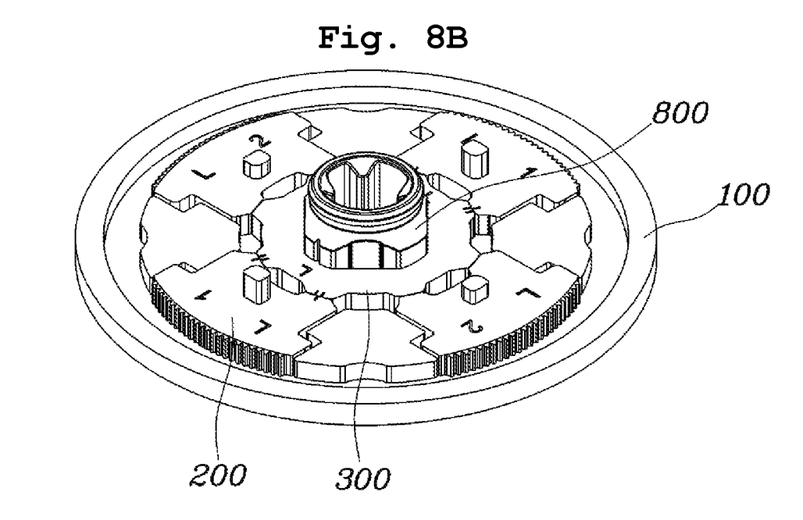
Figure 9:
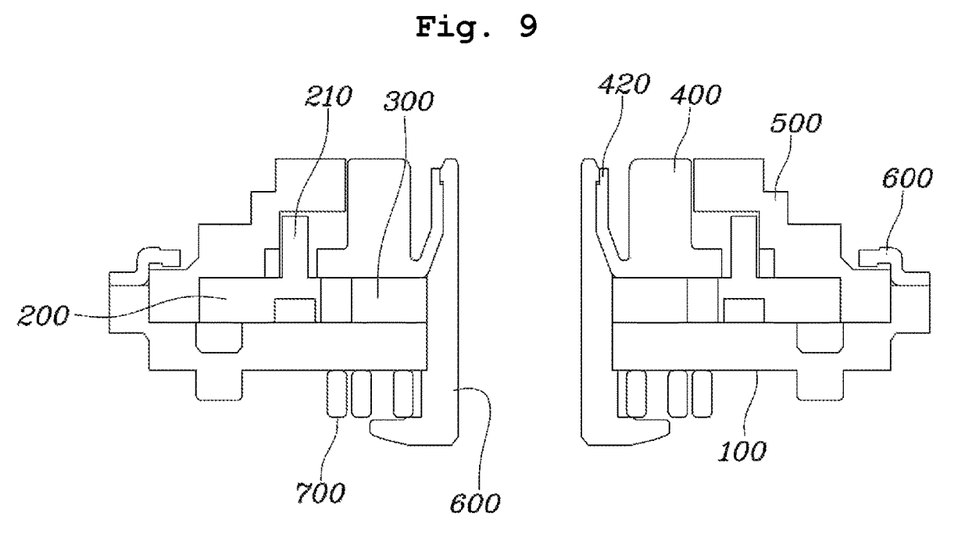
FIG. 9 is a cross-sectional view of the seat recliner for the vehicle according to one form of the present disclosure.

FIGS. 8A and 8B are exploded perspective views respectively showing the first flange and the control part which are assembled according to the form of the present disclosure. FIG. 9 is a cross-sectional view of the seat recliner for the vehicle according to the form of the present disclosure.

Referring to FIGS. 8A, 8B and 9, the control part 400 is provided with a second through hole 430 at the center thereof, and a fastening part 420 protrudes radially inward along an inner circumferential surface of the center portion of the control part which forms the second through hole 430. The seat recliner may further include: a shaft 800 penetrating through the second through hole 430 of the control part 400 and rotated along with the control part 400, and the shaft 800 may be locked to the fastening part 420 in a state of being inserted into the second through hole 430.

Particularly, the first flange 100 and the lock cam 300 each have a through hole at the center thereof, so the shaft 800 may penetrate into through holes provided at the center of the first flange 100 and the lock cam 300 as well as the second through hole 430 provided at the center of the control part 400, and be rotated along with the control part 400 and the lock cam 300. The shaft 800 may be rotate relative to the first flange 100.

Consequently, the shaft 800 may be inserted into the first flange 100 from below the first flange 100, penetrate through the lock cam 300, and then be locked to the fastening part 420 while penetrating through the second through hole 430 of the control part 400. The seat recliner of the present disclosure may further include a spring at a lower surface of first flange 100 to provide torque to the control part 400 in one direction. The spring 700 uses restoring force to apply the torque to the shaft, and the torque may be transmitted to the control part 400 coupled to the shaft 800.

Particularly, shapes of the second through hole 430 and the through hole provided at the center of lock cam 300 may be polygonal shapes having the same number of edges as the number of the lock gear 200. That is, in case of providing four lock gears 200 as illustrated in the form of the present disclosure, the through hole provided at the center of the lock cam 300 may have a rectangular shape. In addition, a cross section of the shaft 800 inserted into the second through hole 430 and the through hole provided at the center of the lock cam 300 may have the same polygonal shape as the shapes of the through holes. In addition, each of edges of the polygonal shape may be a chamfer edge. The first flange 100 may be provided with a through hole having a circular shape to allow the first flange 100 to be freely rotated in a state in which the shaft 800 having the polygonal shape is inserted, so that first flange 100 may be rotated relative to the lock cam 300, the control part 400, and the shaft.

The fastening part 420 may be shaped into a tapered shape so that a lower end thereof is locked on the inner circumferential surface of the center part defining the second through hole 430, and the width of an upper end of the fastening part 420 is narrower than the width of the lower end to form the tapered shape inside the second through hole 430. That is, the fastening part 420 has the tapered shape thereby being gradually tapered from the lower end of the fastening part to the upper end thereof such as a funnel. The lower end of the fastening part 420 is locked on the inner circumferential surface forming the second through hole 430, and the upper end is a free end and may have elasticity to transform the shape thereof.

As an outer diameter of the shaft 800 is formed larger than an inner diameter defined by the upper ends of the fastening parts 420, the shaft 800 is forcibly fitted in the fastening parts 420, so that the shaft 800 may be prevented from being removed in a reverse direction in a state of penetrating through the second through hole 430.

A position of the lock cam 300 may be fixed between the control part 400 and the first flange 100 by the shaft 800, and for this purpose, an additional configuration such as a fixing ring is unnecessary. That is, it is possible to assemble the lock gear 200 and the lock cam 300 with only existing the control part 400 and the shaft 800, without addition any separate device for assembling the control part 400, the lock gear 200, and the lock cam 300 together.

In addition, the shaft 800 is provided with a stopping step on the outer diameter, and the fastening part 420 is provided with a stopping protrusion on the upper end. In this case, when the shaft 800 is inserted into the fastening part 420, it is possible to inhibit or prevent the shaft 800 from being removed in the reverse direction in the state of penetrating through the second through hole 430.

Although exemplary forms of the present disclosure have been described for illustrative purposes, those skilled in the art will appreciate that various modifications, additions and substitutions are possible, without departing from the scope and spirit of the present disclosure.

What is claimed is:

1. A seat recliner for a seat of a vehicle, the seat recliner comprising:
    a first flange including a plurality of guide parts, where guide parts of the plurality of guide parts are spaced apart from each other along a circumferential direction of the first flange such that a plurality of guide spaces are defined between the guide parts of the plurality of guide parts;
    a plurality of lock gears configured to slide inward and outward along the plurality of guide parts, respectively such that lower surfaces of the plurality of lock gears are seated on corresponding guide spaces of the plurality of guide spaces when assembled,
    wherein the plurality of lock gears respectively include:
        a guide protrusion formed on an upper surface of the plurality of lock gears, and
        a plurality of outer teeth provided on an outer end surface thereof;
    a lock cam disposed at a center of the first flange, and configured to compress an inner end of the plurality of lock gears as the lock cam is rotated so that lock gears of the plurality of lock gears slide outward;
    a control part disposed on upper surfaces of the plurality of lock gears and the lock cam, and having at least one guide slit,
    wherein:
        the guide protrusion of the plurality of lock gears is inserted to and guided by the at least one guide slit,
        a center part of the control part is configured to form a second through hole, and
        at least one fastening part is formed along an inner circumferential surface of the center part of the control part forming the second through hole;
    a shaft configured to penetrate through the second through hole and rotate with the control part, wherein the shaft is locked to the at least one fastening part in a state of being inserted into the second through hole; and
    a second flange including:
        a first part covering an upper part of lock gears of the plurality of lock gears or the guide parts of the plurality of guide parts, and
        a second part provided on an upper part of an inner circumferential surface of the first part and configured to cover an outside of the at least one guide slit of the control part, the second part coupled to a seat frame of the seat by inserting an outer circumferential surface of the second part into an assembly hole of the seat frame of the seat,
    wherein the at least one fastening part has a tapered shape along an inward direction of the second through hole, so that a lower end of the at least one fastening part is fixed to the inner circumferential surface of the center part and is wider than an upper end of the at least one fastening part.

2. The seat recliner of claim 1, wherein the outer circumferential surface of the second part is shaped into a single circular line without a step provided inward or outward.

3. The seat recliner of claim 1, wherein the second flange is configured such that the outer circumferential surface thereof is inserted into the assembly hole of the seat frame and is welded along entire circumference of the second flange, thereby being coupled to the seat frame.

4. The seat recliner of claim 1, further comprising:
    a retainer disposed on an upper part of a base part of the second flange and configured to fix coupling of the first flange and the second flange,
    wherein the base part of the second flange is provided on a lower part of an outer circumferential surface of the first part, and the second flange has inner teeth engaged with lock gears of the plurality of lock gears.

5. The seat recliner of claim 1, wherein the second part is provided with a locking section, and
    wherein the guide protrusion, which is guided by the at least one guide slit, does not interfere with an inner circumferential surface of the second part.

6. The seat recliner of claim 5, wherein the second part is provided with a free section supporting the guide protrusion so that the plurality of lock gears do not slide outward through the inner circumferential surface of the second part.

7. The seat recliner of claim 1, wherein the second flange further includes a third part provided on an upper part of the inner circumferential surface of the second part, and configured to cover an upper part of the guide protrusion, and
    wherein an inner circumferential surface of the third part forms a first through hole, and a center part of the control part is inserted into the first through hole and protrudes upward.

8. The seat recliner of claim 1, wherein the at least one fastening part includes a plurality of fastening parts, and wherein an inner diameter of the shaft is greater than an inner diameter defined by upper ends of fastening parts of the plurality of fastening parts, so that the shaft is forcibly fitted in the fastening parts and is prevented from being removed in a reverse direction in a state of penetrating through the second through hole.

* * * * *